United States Patent
Lee

(10) Patent No.: US 8,811,244 B2
(45) Date of Patent: Aug. 19, 2014

(54) METHOD AND APPARATUS FOR PERFORMING RADIO ACCESS WITH DELAY IN A WIRELESS COMMUNICATION SYSTEM

(75) Inventor: Ki Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 13/452,401

(22) Filed: Apr. 20, 2012

(65) Prior Publication Data

US 2012/0269122 A1  Oct. 25, 2012

Related U.S. Application Data

(60) Provisional application No. 61/478,031, filed on Apr. 21, 2011.

(30) Foreign Application Priority Data

Apr. 13, 2012  (WO) ................ PCT/KR2012/002795

(51) Int. Cl.
*H04B 7/00*  (2006.01)

(52) U.S. Cl.
USPC ............................ 370/310; 370/476; 370/522

(58) Field of Classification Search
None
See application file for complete search history.

(56) References Cited

U.S. PATENT DOCUMENTS

| | | |
|---|---|---|
| 2008/0305819 A1 | 12/2008 | Chun et al. |
| 2009/0196230 A1 | 8/2009 | Kim et al. |
| 2009/0232058 A1* | 9/2009 | Lee et al. ..................... 370/328 |
| 2009/0239545 A1 | 9/2009 | Lee et al. |
| 2011/0274040 A1* | 11/2011 | Pani et al. ..................... 370/328 |
| 2012/0178436 A1* | 7/2012 | Fan ............................ 455/422.1 |

FOREIGN PATENT DOCUMENTS

| | | |
|---|---|---|
| KR | 10-2007-0076374 A | 7/2007 |
| KR | 10-2007-0107619 A | 11/2007 |

OTHER PUBLICATIONS

"3rd Generation Partnership Project; Technical Specification Group Radio Access Network; Evolved Universal Terrestrial Radio Access (E-UTRA); Radio Resource Countrol (RRC); Protocol specification (Release 9)," Section 6.2.2 of 3GPP TS 36.331 V9.5.0 (Dec. 2010).

* cited by examiner

*Primary Examiner* — Kevin C Harper
(74) *Attorney, Agent, or Firm* — Birch, Stewart, Kolasch & Birch, LLP

(57) ABSTRACT

In one design, a method to change a network-assigning mechanism and to use a distributed UE-selecting mechanism with the minimum possible information transferred from the network to the UE is proposed. In particular, it provides mechanism to define a lower bound and an upper bound for the extended wait time. For instance, the method comprises transmitting a RRC connection request message to a network, wherein an establishment cause of the RRC connection request message is set to be delay tolerant or low priority; receiving information associated with a first wait time included in an RRC connection reject/release message from the network; and performing a radio access to the network with a delay which is determined based on a lower bound of the first wait time and a upper bound of the first wait time.

11 Claims, 9 Drawing Sheets

METHOD AND APPARATUS FOR PERFORMING RADIO ACCESS WITH DELAY IN A WIRELESS COMMUNICATION SYSTEM

CROSS-REFERENCE TO RELATED APPLICATIONS

The present application for patent claims priority to Provisional Application No. 61/478,031 filed on Apr. 21, 2011, and International Application No. PCT/KR2012/002795 filed on Apr. 13, 2012, which are incorporated by reference in their entirety herein.

BACKGROUND OF THE INVENTION

1. Field of the invention

The technical features of this document relate to wireless communications using a number of orthogonal frequency division multiple (OFDM) symbols, and more particularly, to a method and apparatus for processing a radio access to a base station with a delay configured by a number of values associated with upper/lower bounds.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication is the communication between machines that do not necessarily need human intervention. The 3GPP has started an effort to determine potential network optimizations that could lower the operational costs associated with offering these new M2M services.

SUMMARY OF THE INVENTION

The technical features of this document provide a method for performing a radio access procedure in a wireless communication system using a number of orthogonal frequency division multiple (OFDM) symbols.

In one aspect, the method comprises transmitting a radio resource control (RRC) connection request message to a network, wherein an establishment cause of the RRC connection request message is set to be delay tolerant or low priority; receiving information associated with a first wait time included in an RRC connection reject message or an RRC connection release message from the network; and performing a radio access to the network with a delay which is determined based on a lower bound of the first wait time and a upper bound of the first wait time, wherein the lower bound of the first wait time and the upper bound of the first wait time are indicated by the information on the first wait time.

In the method, the delay can be determined to be an integer value drawn from a uniform distribution between the lower bound and the upper bound In the method, the integer value can be transmitted from an RRC of the UE to a non-access stratum (NAS) of the UE to determine a mobility management back-off timer value.

In the method, the information associated with the first wait time can include a first data field and a second data field, wherein the upper bound is indicated by the first data field and the lower bound is determined using a multiplication between a first value indicated by the first data field and a second value indicated by the second data field In the method, the information associated with the first wait time can consist of most significant bits (MSBs) and least significant bits (LSBs), wherein the MSBs consist of consecutive bits representing the upper bound, and the LSBs consist of consecutive bits representing a fraction, wherein the fraction is used to determine the lower bound In the method, the step of performing the radio access to the network can include performing an access class (AC) barring procedure to a base station. Further, the AC barring procedure can be performed after a timer is running, wherein a time value for the timer is a random number drawn from a uniform distribution between the upper bound and the lower bound.

In the method, a second wait time can be further included in the RRC connection to reject message or the RRC connection release message.

In the method, the first wait time is an extended wait time and the second wait time is a wait time.

In another aspect, the method comprises transmitting a radio resource control (RRC) connection request message to a network, wherein an establishment cause of the RRC connection request message is set to be delay tolerant or low priority; in response to the RRC connection request message, receiving an RRC connection reject message from the network including first information associated with an extended wait time, wherein the first information includes a first portion and a second portion; determining a lower bound for the extended wait time and an upper bound for the extended wait time by using the first information associated with the extended wait time; drawing a random number from a uniform distribution between the lower bound and the upper bound for the extended wait time; starting an extended wait timer according to the drawn number; and performing an access class (AC) barring procedure after the extended wait timer is expired.

In another aspect, the method comprises establishing a radio resource control (RRC) connection to a network, wherein an establishment cause of the RRC connection is set to be delay tolerant or low priority; receiving an RRC connection release message from the network including first information associated with an extended wait time, wherein the first information includes a first portion and a second portion; determining a lower bound for the extended wait time and an upper bound for the extended wait time by using the first information associated with the extended wait time; drawing a random number from a uniform distribution between the lower bound and the upper bound for the extended wait time; starting an extended wait timer according to the drawn number; and performing an access class (AC) barring procedure after the extended wait timer is expired.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
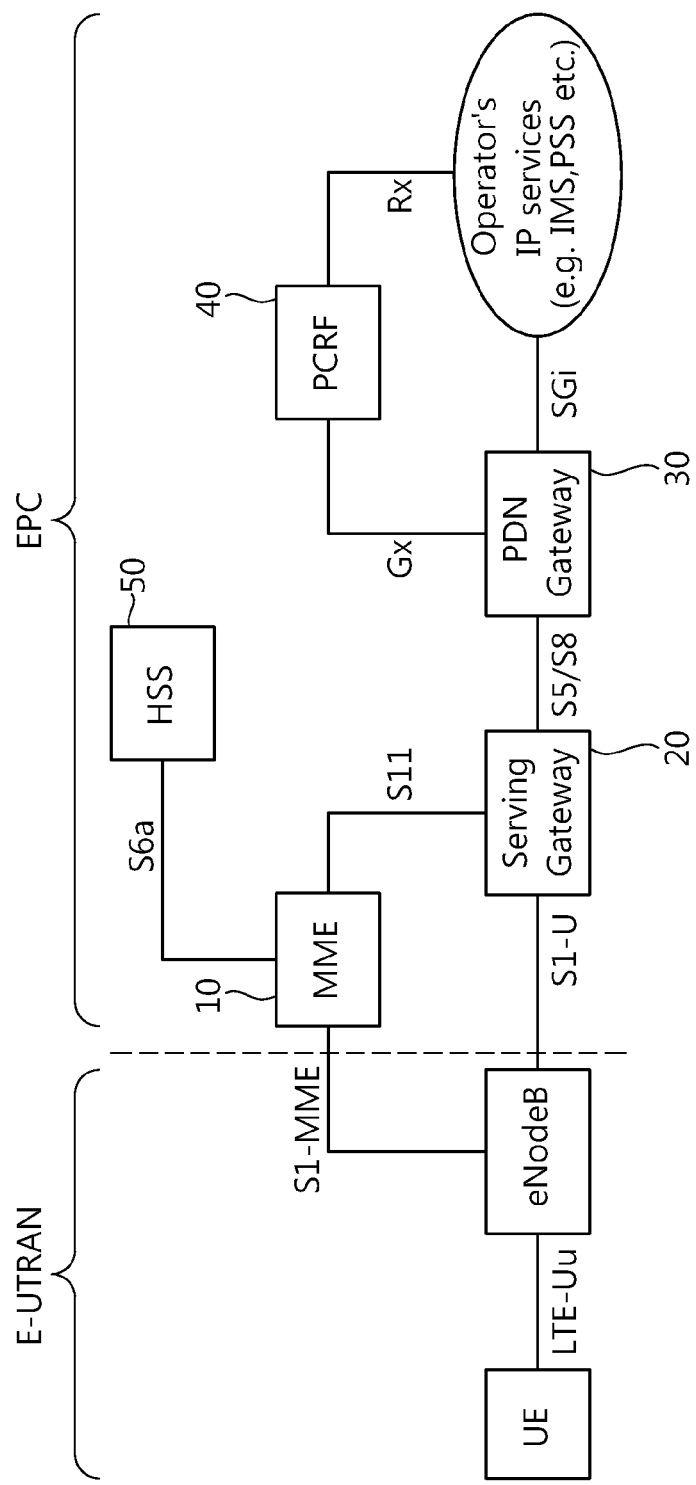
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits a paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
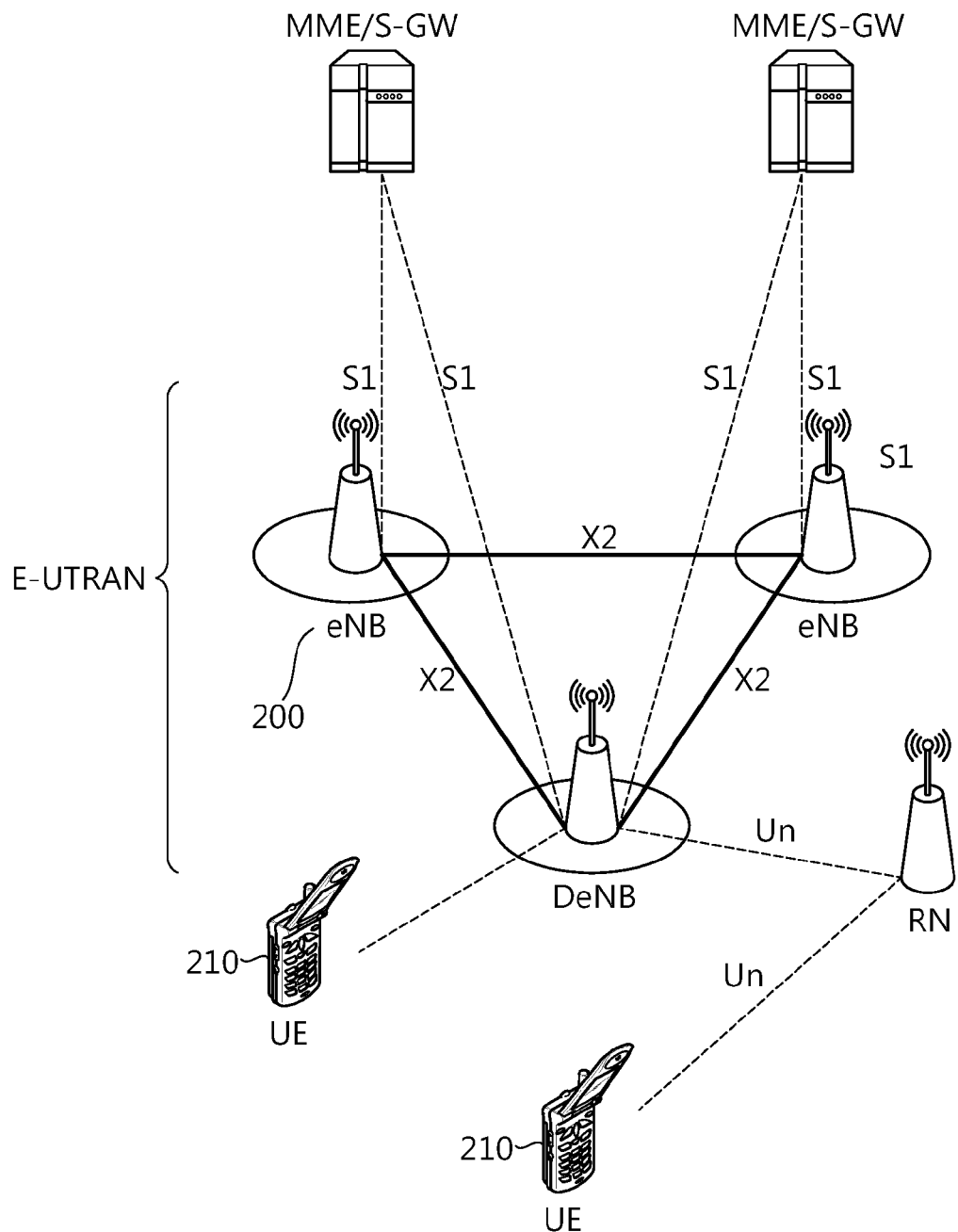
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, a Un interface is defined, whereas a Uu interface is further defined between the RN and the UE.

As discussed above, the machine to machine (M2M) communication is the communication between machines that do not necessarily need human intervention, and the 3GPP has started an effort to determine potential network optimizations. The M2M communication, which is also referred to as machine type communication (MTC), is expected to have applications in areas, such as smart metering, home automation, e-Health, fleet management, etc.

M2M communications have a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

Hereinafter, a method and apparatus for performing a radio access to a network with a delay is provided in detail. The following description provides a method and apparatus for processing a signal associated with a Radio Resource Control (RRC) signaling, Random Access (RA) procedure, and extended wait time used during the random access procedure in the wireless communication systems such as 3GPP LTE. Further, the following description is associated with the machine to machine (M2M) communications. In particular, the proposed method and apparatus provide a lower bound and upper bound for the extended wait time, which is associated with the RRC connection establishment, to a certain UE with delay tolerant/lower priority characteristics.

The random access procedure can be initiated with an Access Class (AC) barring. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB 2). SIB 2 may include a set of AC barring parameter for Mobile Originated (MO) calls and/or MO signaling. This set of parameters comprises a probability factor and a barring timer for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring timer value. For ACs 11-15, if the UE initiates an MO call and the relevant AC barring parameters are included, access is barred whenever the bit corresponding to all of the UE's AC is set. The behavior is similar in the case of UE-initiated MO signaling.

Figure 3:
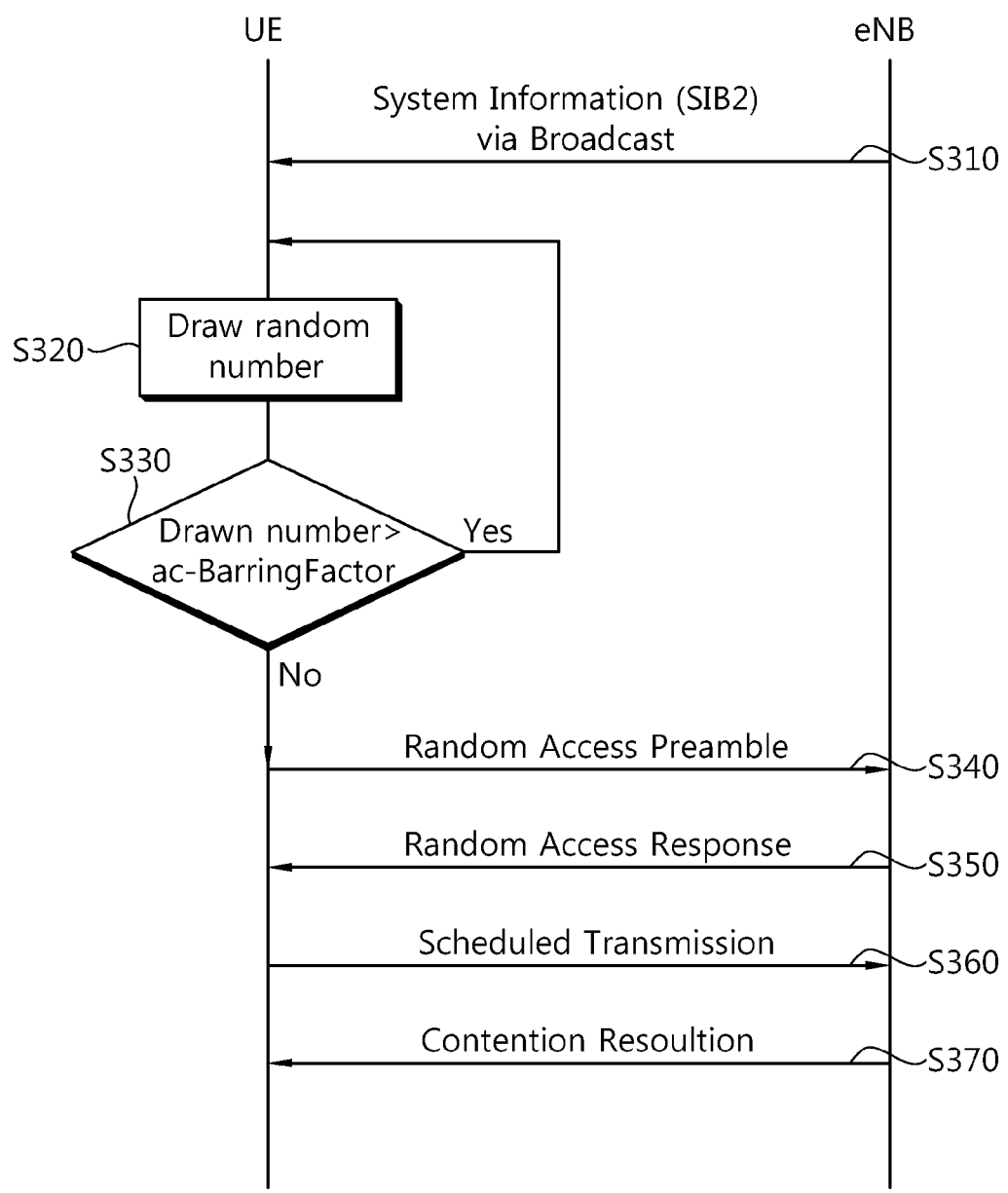
FIG. 3 is a flow diagram showing a random access procedure according to an embodiment of the proposed method.

FIG. 3 is a flow diagram showing a random access procedure according to an embodiment of the proposed method.

In order to obtain new connection (e.g., a data connection or signaling connection) UEs should first perform a RA procedure and this is a common feature in most cellular system. Further, the RA procedure can be categorized into contention-based and contention-free. The example depicted in FIG. 3 is directed to the contention-based RA procedure.

Referring to FIG. 3, in step S310, the relevant parameters are transmitted from a base station (e.g., eNB). Various control information can be broadcasted via 'System information', such as Master Information Block (MIB) and System Information Block type k (k=1, 2, . . . ), and the relevant paragraph associated with the AC barring is broadcasted via SIB 2, as discussed above. As explained above, SIB 2 provides information for UEs how they perform the RA procedure. The SIB 2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0,1). If the random number drawn is less than the 'ac-BarringFactor', the UE performs subsequent steps of the RA procedure (S330).

Referring to FIG. 3, in step S340, the UE selects a particular random access preamble and certain Random Access Channel (RACH) resources from an available random access preamble set and RACH resources, and transmits the selected random access preamble on the selected RACH to the eNB.

In step S350, the eNB receives the random access preamble, and then transmits a random access response to the UE. The random access response includes a time advance (TA) and uplink radio resource allocation information for the transfer of a scheduled message to be described below. In addition, the random access response includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to the radio resource allocation information included in the random access response. The scheduled message, which is also referred to as a message 3, may include an RRC connection request message.

In step S370, the BS receives the scheduled message from the UE, and then transmits a contention resolution message, which is also referred to as a message 4, to the UE. In order to check whether contention occurs with respect to the message 3, a contention resolution timer is initiated after transmitting the message 3. If the message 4 is not successfully received until the contention resolution timer expires, step 370 may be repeated based on predefined configuration.

After the RRC connection request message is accepted by the network, an RRC connection can be successfully established and the UE enters an RRC connected mode. However, the RRC connection request may be rejected, and the UE may thereafter receive an 'RRCConnectionReject' message from the eNB. Further, the UE may consider that the RRC connection requested is regarded as rejected without explicitly receiving the 'RRCConnectionReject' when the contention resolution timer expires without receiving the message 4. In these cases, a wait time can be applied before performing the AC barring to avoid the large number of UE-initiated call attempts. In particular, the UE is required to avoid a subsequent AC barring during the wait time, which is indicated by the network. In the standard, a range of the wait time is set to [1, 16 (sec)].

In addition, if an 'RRCConnectionRelease' message is received by a UE, the wait time is also applied before performing the AC barring. The RRCConnectionRelease message is received when the RRC Connection is released after the RRC connection is successfully established.

Recently, 3GPP has newly introduced an 'extendedWait-Time', which is an extended version of the above-mentioned wait time. Accordingly, the extended wait time is applicable to a case where an RRC connection request is regarded as rejected or an RRC connection is released. In the meantime, the extended wait time can be additionally used with the wait time. Namely, for a certain UE, both the wait time and the extended wait time can be applied.

A range of the extended wait time was originally set to [1, 4096 (sec)], but recently changed to [1, 1800 (sec)]. An exact time value of the extended wait time can be contained in the 'RRCConnectionReject' or 'RRCConnectionRelease' message. Once the extended wait time is contained, the UE reports to the upper layer (i.e., NAS layer), sets the timer (not yet specified) value as the received 'extendedWaitTime', and starts the timer of the extended wait time. While the timer is running, the UE is not allowed to attempt an RRC connection request. The use of 'extendedWaitTime' is to prevent the UE (released or rejected) from attempting 'RRCConnectionRequest' for a longer period of time than the wait time.

The concept of the extended wait time is highly associated with M2M communication, delay tolerant access, and/or lower priority access. Namely, it is preferred that the extended wait time is applied to a UE, which has M2M, delay tolerant, and/or lower priority characteristics. For instance, if the UE is identified as an M2M (or MTC) devices, and/or a cause code in RRC messages (e.g., RRC connection request/release messages) is identified as 'delay tolerant' or 'lower priority', the extended wait time can be applicable. Meanwhile, it is noted that even H2H devices (e.g., human UEs), as opposed to M2M devices, can have the delay tolerant or lower priority characteristics, when a certain connection or an application in the H2H devices has such characteristics.

The following examples (e.g., examples in FIGS. 3-7) are related to a case where the extended wait time is applied. Namely, in examples to be explained below, UEs performing a radio access are identified as UEs with M2M, delay tolerant, and/or lower priority characteristics.

Hereinafter, the problems of mechanism related to the extended wait time are further described. The value of the extended wait time is set by the network and a back-off timer value for the MM back-off timer is determined at least according to the extended wait time. In order to prevent a situation in which large numbers of UEs simultaneously initiate deferred requests, the network should select the value for the MM back-off timer for the rejected UEs so that timeouts are not synchronized. Due to this reason, the network needs to organize (schedule) the value of the extended wait time for possibly many UEs associated with the use of the extended wait time.

Such centralized scheduling mechanism in which a time value is exclusively determined by the core network has the following problems. The duration of the extended wait time is on average much longer than the wait time. Thus, during this period of time, UEs recently released or rejected from the network do not necessarily remain in the same cell. Therefore, the centralized scheduling cannot reflect the possible changes of future load condition. Even if it were possible to improve the accuracy through the use of any possible prediction methods, it would be still computationally expensive and the level of accuracy from the scheduling results still exist and get larger as the selected value of the extended wait time increases.

Further, it is noted that a human UE, as opposed to a machine-type UE, may be equipped with low priority access (or delay tolerant access). During the time that the network has set, some of in-cell UEs may leave the cell whereas some UEs may come into the cell. Therefore scheduling itself is not supposed to be accurate and therefore it is not necessary in contrast to what was intended (i.e., to avoid simultaneous attempts) in the standard specification.

In addition, there is no need to include the wait time range, i.e., [1, . . . 16], in the extended wait time range because the purpose of using the extended wait time is to give a longer time period to UE that the wait time cannot represent.

Therefore, the proposed method proposes to change a network-assigning mechanism and to use a distributed UE-selecting mechanism with the minimum possible information transferred from the network to the UE. In particular, the proposed method provides mechanism to define a lower bound and an upper bound for the extended wait time.

Figure 4:
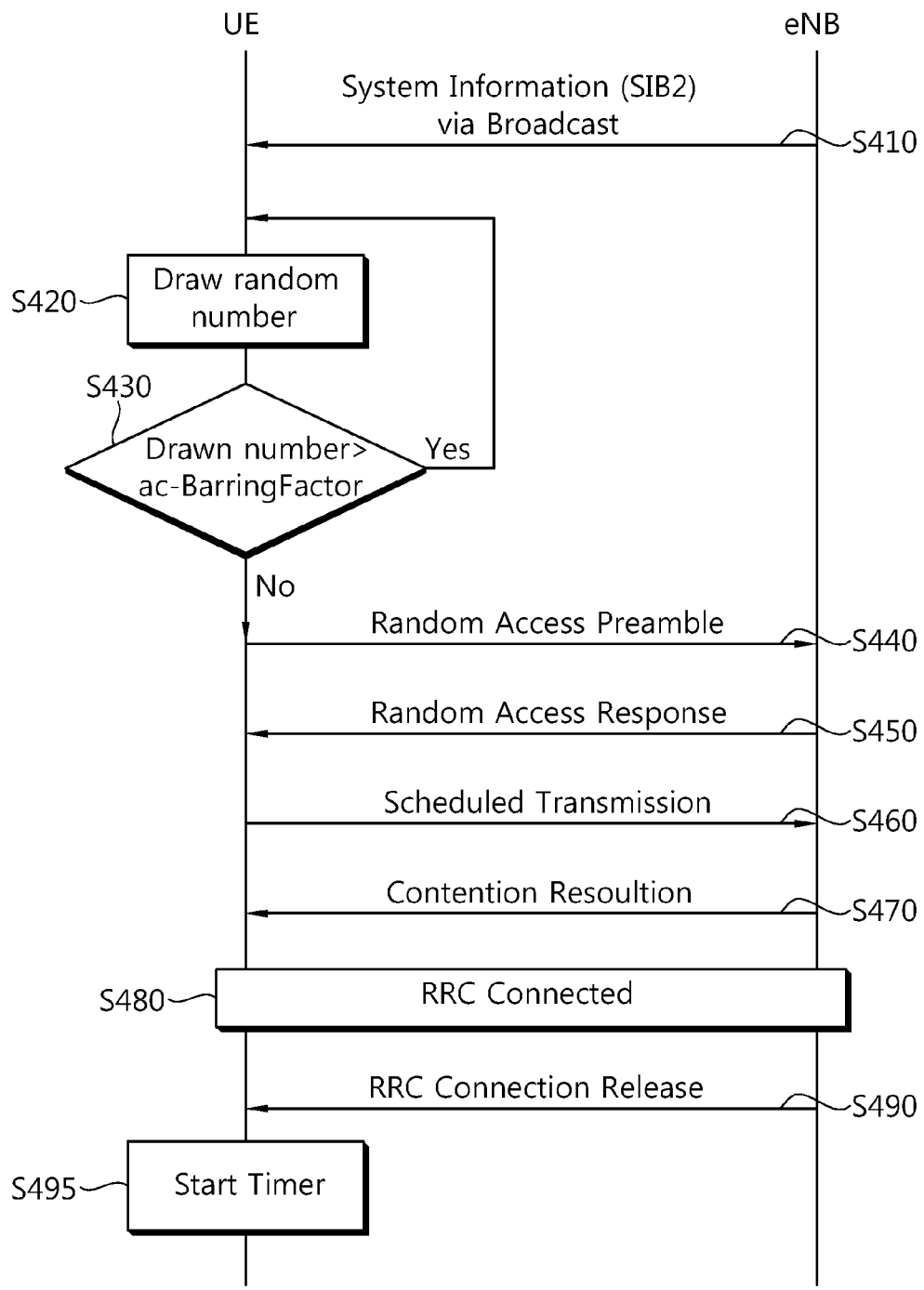
FIG. 4 is a view illustrating a method of processing a signal associated with the extended wait time.

FIG. 4 is a view illustrating a method of processing a signal associated with the extended wait time. Referring to FIG. 4, in step S410, parameters associated with the AC barring are transmitted from an eNB via a SIB 2. As discussed above, in step S420, the UE can draw a random number from a uniform distribution (0,1). In step S430, if the random number drawn is less than the 'ac-BarringFactor' included in the SIB 2, the UE performs subsequent steps of the RA procedure.

In step S440, a UE selects a particular random access preamble and certain Random Access Channel (RACH) resources from an available random access preamble set and RACH resources, and transmits the selected random access preamble on the selected RACH to the eNB. In step S450, the eNB receives the random access preamble, and then transmits a random access response to the UE. In step S460, the UE receives the random access response, and then transmits the scheduled message according to the radio resource allocation information included in the random access response. The scheduled message, which is also referred to as a message 3, may include an RRC connection request message. In step S470, the BS receives the scheduled message from the UE, and then transmits a contention resolution message, which is also referred to as a message 4, to the UE.

After the RRC connection request message is accepted by the network, an RRC connection can be successfully established, and thereafter the UE enters an RRC connected mode (S480). After the RRC connection is established, an 'RRC-ConnectionRelease' message including information on the extended wait time can be transmitted from the eNB received by a UE (S490).

If the RRC connection is released with the information on the extended wait time, the extended wait time is applied before performing a subsequent AC barring (S495). In particular, the UE starts a timer for the extended wait time, and avoids attempting the subsequent AC barring while the timer is running Regarding the timer for the extended wait time, the information contained the RRC connection release message indicates a lower bound and an upper bound of the extended wait time. Further, it is preferred that an exact time during which the timer is running is set to a selected value from a certain distribution (e.g., uniform distribution) between the lower bound and the upper bound. More detailed features of indicating the lower bound and upper bound of the extended wait time will be described below. After the timer expires, the UE performs a radio access, which includes the AC barring, to the eNB.

The example depicted in FIG. 4 is related to a case where the RRC connection is released. Hereinafter, an example which is directed to a case where an RRC connection request is rejected will be described.

Figure 5:
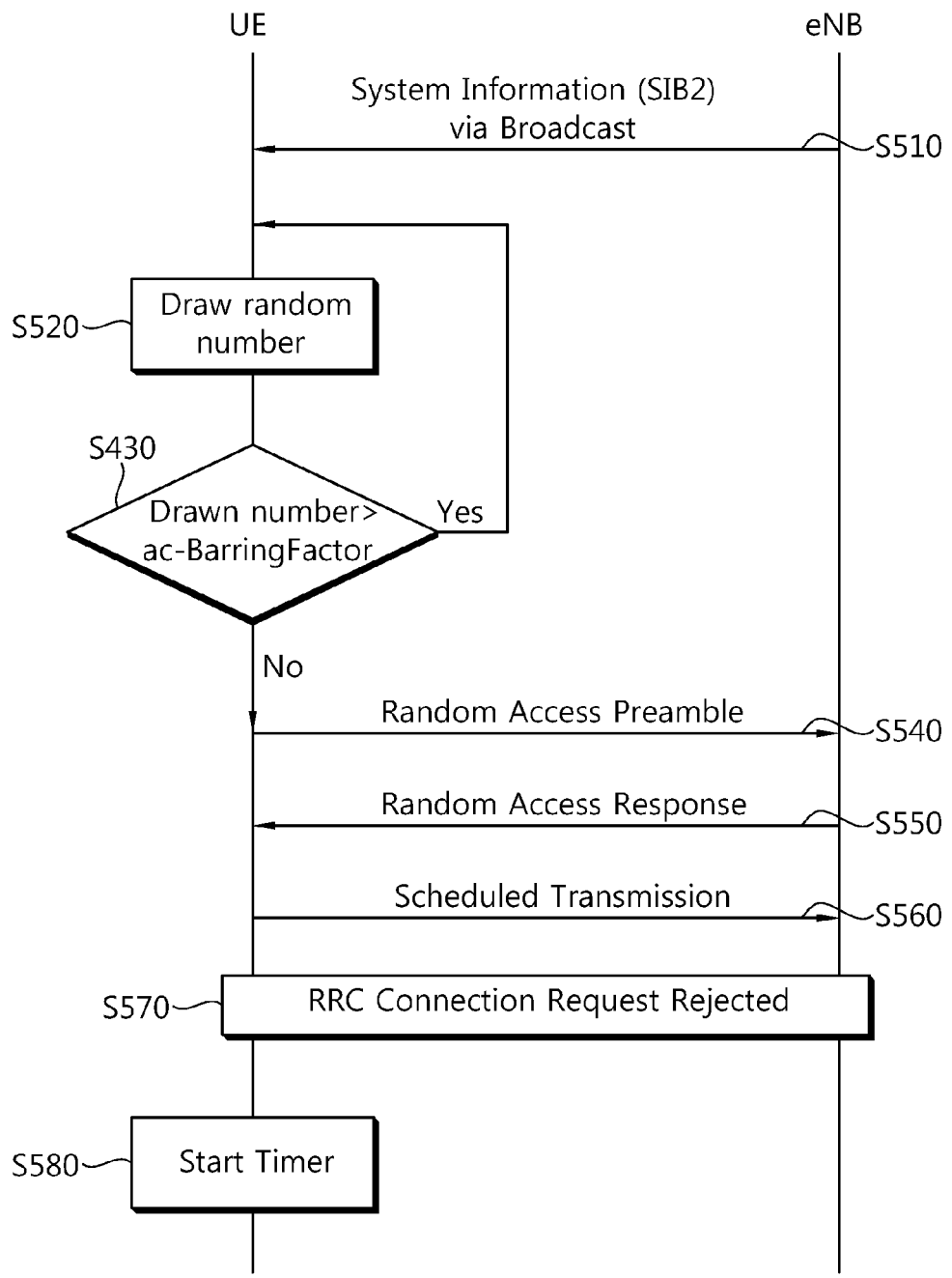
FIG. 5 is a view illustrating another example of processing a signal associated with the extended wait time.

FIG. 5 is a view illustrating another example of processing a signal associated with the extended wait time. Referring to FIG. 5, in step S510, parameters associated with the AC barring are transmitted from an eNB via a SIB 2. As discussed above, in step S520, the UE can draw a random number from a uniform distribution (0,1). In step S530, if the random number drawn is less than the 'ac-BarringFactor' included in the SIB 2, the UE performs subsequent steps of the RA procedure.

In step S540, a UE selects a particular random access preamble and certain Random Access Channel (RACH) resources from an available random access preamble set and RACH resources, and transmits the selected random access preamble on the selected RACH to the eNB. In step S550, the eNB receives the random access preamble, and then transmits a random access response to the UE. In step S560, the UE receives the random access response, and then transmits the scheduled message according to the radio resource allocation information included in the random access response. The scheduled message, which is also referred to as a message 3, may include an RRC connection request message.

The RRC connection request may be rejected, and the UE may thereafter receive an 'RRCConnectionReject' message from the eNB (S570). The RRC connection reject message may include information on the extended wait time. When the information on the extended wait time is received, the extended wait time is applied before performing the AC barring (S580). In particular, the UE starts a timer for the extended wait time, and avoids attempting the AC barring while the timer is running Regarding the timer for the extended wait time, the information contained the RRC connection release message indicates a lower bound and an upper bound of the extended wait time. Further, it is preferred that an exact time during which the timer is running is set to a selected value from a certain distribution (e.g., uniform distribution) between the lower bound and the upper bound, as explained above. After the timer expires, the UE performs a radio access, which includes the AC barring, to the eNB.

In addition, as discussed above, the UE may consider that the RRC connection requested is regarded as rejected without explicitly receiving the 'RRCConnectionReject' when the contention resolution timer expires (S570). In this case, a wait time can be applied before performing the AC barring to avoid the large number of UE-initiated call attempts.

Hereinafter, detailed features of indicating the lower bound and upper bound of the extended wait time are described below. The proposed method includes a number of examples to indicate the lower bound and upper bound of the extended wait time. The first example is to use a defined set of integers denoting the upper bound and a defined set of fraction.

An exemplary set of time values for the upper bound (S) for the extended wait time may include {s16 (i.e., 16 seconds), s32, s64, s128, s256, s512, s1024, and s1800}. Further, a defined set of fractions (F) may include {f12, f13, f14, f15}, f12 denotes ½, f13 denotes ⅓, etc. The lower bound of the extended wait time can be defined by multiplication between the upper bound (S) and the fractions (F). For instance, S (e.g., s1800) and F (e.g., f12) are transmitted by the RRC connection reject message or the RRC connection release message, and the lower bound is defined by S×F (e.g., s1800×½).

Once the lower bound and the fraction are indicated, the UE may randomly select a value (e.g., integer value) from a certain distribution (e.g., uniform distribution) between 'S×F' and 'S'. In a case where the lower bound is set to be '1', F can be '1/S' so that the range becomes [1, S].

Modification of the foregoing examples is as follows. When considering a range of the extended wait time, a range of the wait time (i.e., [1, 16]) can be taken into account. For instance, the lower bound of the extended wait time can be configured such that the range of [1, 16] can be excluded from a range of the extended wait time. In other words, the fraction (F) is configured so that a possible set of the lower bounds includes {s16, s32, s64, s1800}. Alternatively, the lower bound of the extended wait time can be configured such that the range of [1, 16] can be included. In other words, the fraction (F) is configured so that a possible set of the lower bounds includes {s1, s4, s16, s32, s64, . . . , s1800}.

A set of the lower bounds or fractions can be {f1M$_1$, f1M$_2$, f1M$_3$, f1M$_4$} where M$_y$ (where y=1, 2, 3 . . . ) indicates an integer so that S×f1M$_y$ can be used as a lower bound of the uniform distribution.

In the foregoing examples, the upper bound is explicitly indicated without further calculation (multiplication). However, the following examples show different methods. First information, i.e., s$_{N1}$, s$_{N2}$, . . . , s$_{Nm}$, and second information, i.e., r$_{18}$, r$_{14}$, r$_{12}$, r$_{11}$ (r$_{18}$ means ⅛, r$_{14}$ means ¼, r$_{12}$ means ½, etc.), can be transmitted to the UE via the RRC connection reject or RRC connection release message. The UE then determines that the upper bound (sec) is min {S$_{Ni}$×(1+r$_{1j}$), 1800} and the lower bound is max {S$_{Ni}$×(1−r$_{1j}$), 1}.

Figure 6:
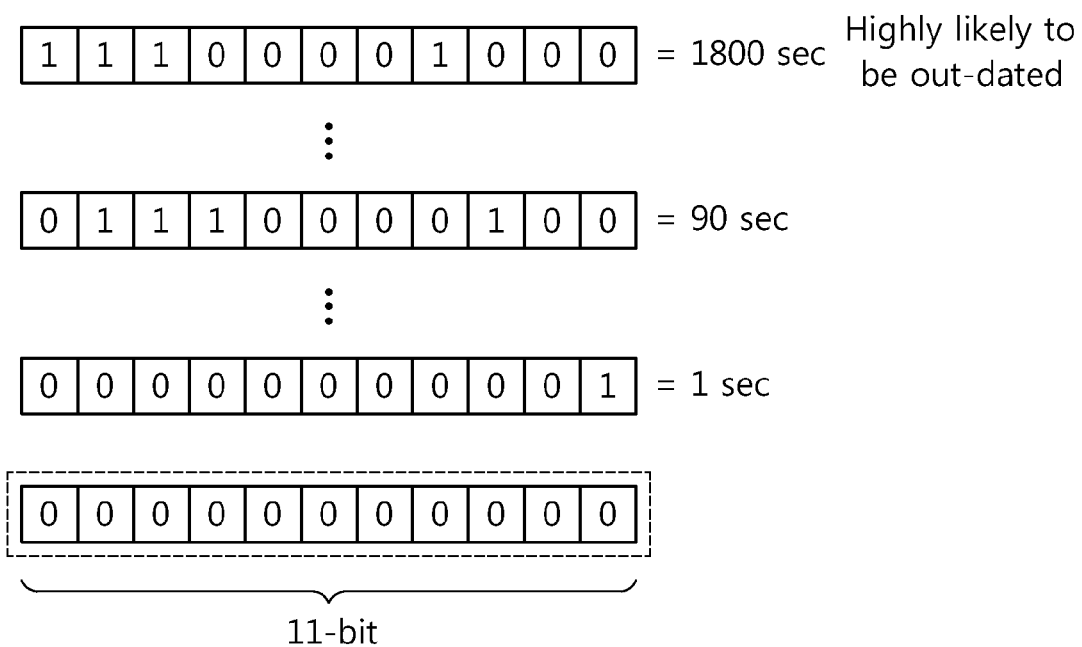
FIG. 6 is a view illustrating a method for transmitting the extended wait time.

FIG. 6 is a view illustrating a method for transmitting the extended wait time. 11 bits depicted in FIG. 6 represent a value from range {1, 2, . . . , 1800 (sec)}. Namely, the example of FIG. 6 requires 11 bits to represent the extended wait time.

Figure 7:
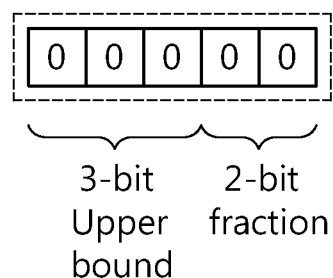
FIG. 7 is a view illustrating another method for transmitting the extended wait time.

FIG. 7 is a view illustrating another method for transmitting the extended wait time. A number of bits in FIG. 7 are divided into two parts, i.e., most significant bits (MSBs) and least significant bits (LSBs). The MSBs are the bits closest to, and including, a MSB. Further, the LSBs are the bits closest to, and including, an LSB. Features of FIG. 7 are applicable to the foregoing examples. For instance, the MSBs can be 3-bit and the LSBs can be 2-bit, and the 5-bit information represents the extended wait time. In particular, first 3-bit (MSBs) are used to represent the upper bound (S), which can be one of {s1, s4, s16, s64, s256, s1024, s1800, reserved} (3 bits '000' denote s1, '001' denote s4, '110' denote s1800), and the lower bound multiplier (F), which is multiplied by the upper bound to compute lower bound {f12, f13, f14, f15}. If the lower bound multiplier (F) f12 is chosen and the upper bound index is chosen as '110', the UE will calculate the lower bound as 1800 (sec)*(½)=900 (sec) and then perform a random draw from the uniform distribution (900, 1800).

In addition, an additional procedure can be performed. The information on the extended wait time is transmitted from an RRC of the eNB via an RRC connection reject message or RRC connection release messages. The information may comprises MSBs (e.g., S16, S32, etc.) and LSBs (e.g., f12, f13, f14, etc.), and an RRC of the UE may extract or acquire the MSBs and LSBs. After such information is acquired by the UE, the UE may draw an integer between a lower bound and an upper bound which are determined by the acquired information.

Once the integer is drawn, the RRC of the UE provides it to the NAS layer of the UE. The UE NAS layer determines an MM back-off time value for an MM back-off timer based on the drawn integer value. The UE avoids subsequent transmission of MM signaling while the MM back-off timer is running The proposed method has advantageous technical effects as follows. Based on the previous mechanism scheduling (e.g., random pick-up as a simple method) to the eNB. However, eNB does not have enough input data for performing scheduling. For instance, the eNB does not know whether a current UE has been rejected or release before, since identification information such as S-TMSI and random pick-up of a 40-bit long digit is not unique. Further, even assuming the eNB made a perfect scheduling with limited input data, the UEs dwelling in the cell may move out to another cell. Therefore, the previous scheduling result bears uncertainty and thus is not useful.

Figure 8:
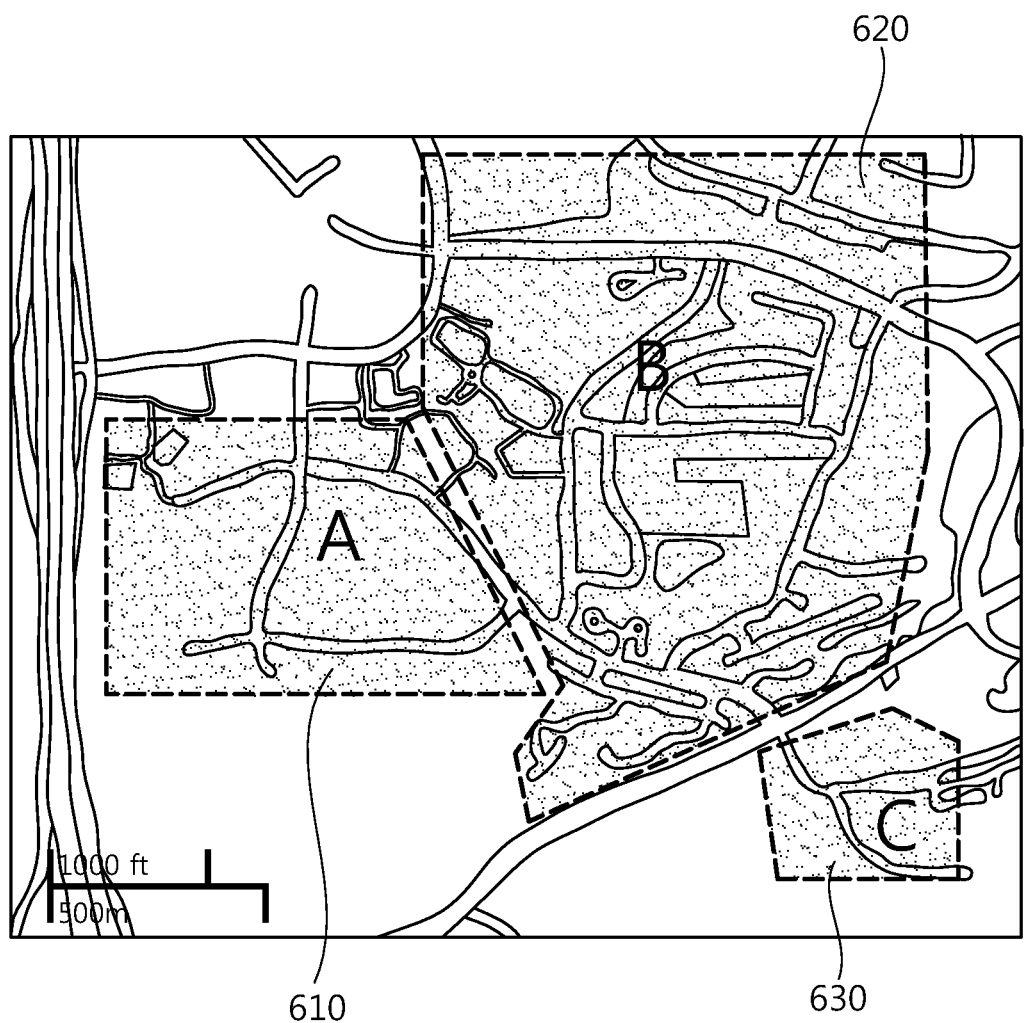
FIG. 8 is a view illustrating examples on how fast the traffic distribution can change, especially during rush hours in business/school districts and residential areas.

FIG. 8 is a view illustrating examples on how fast the traffic distribution can change, especially during rush hours in business/school districts and residential areas. In such cases, taking the originally received value for the use of the MM back-off timer may lead to a wrong result: even if the CN overload situation changed, the UE must follow the given restrictions (e.g., do not perform the RA procedure) while the timer is running, which may deteriorate performance of the network.

FIG. 8 is related to traffic distribution during day times. Business districts (610) and school districts (630) are populated whereas residential areas (620) become less populated. The change of distribution (population density) may occur within a short period of time, less than half an hour. For example, (1) business districts (610) will start getting populated from a little before 8 AM and saturated (most employees in this Zone are present) by around 8 AM (e.g., 7:45~8:10 AM); (2) school districts (630) will start getting populated from 6:40 (gate open) until/before 7:00 AM (gate-in deadline); (3) residential areas (620) will start getting less populated since people go to school or office; (4) most students living near the school will be given a ride by their parents, in which case some parents will go back home (within 10-30 min) whereas others will go another place (within 10-30 min) However, within a short period of time, business districts (610) and school districts (630) become less populated whereas residential areas (620) become populated. In sum, the change of distribution (population density) may occur within half an hour, an thus the previous scheduling result bears uncertainty and thus is not useful On the other hand, the proposed method allows the core network not to assume the responsibility of scheduling the value of the extended wait time and not to produce uncertain, invalid, and random schedule. Namely, the proposed method provides a de-centralized method, which enables a drawn value for the extended wait time not to be determined by the core network exclusively. Further, with the proposed method, the burden of signaling can be reduced especially when there are a large number of UEs rejected or released from the network.

Related technology of the wait time is disclosed in Section 6.2.2 of 3GPP TS 36.331 V9.5.0 (2010-12) "Radio Resource Control (RRC); Protocol specification (Release 9)," which is incorporated by reference in its entirety herein. The example discussed above can be explained in the context of parameters used in the Section 6.2.2 of 3GPP TS 36.331 as follows:

```
RRCConnectionReject message
1> -- ASN1START
1> RRCConnectionReject ::= SEQUENCE {
2> criticalExtensions CHOICE {
3> c1 CHOICE {
4> rrcConnectionReject-r8 RRCConnectionReject-r8-IEs,
4> spare3 NULL, spare2 NULL, spare1 NULL
3> },
3> criticalExtensionsFuture SEQUENCE {}
2> }
1> }
1> RRCConnectionReject-r8-IEs ::= SEQUENCE {
2> waitTime INTEGER (1..16),
2> nonCriticalExtension RRCConnectionReject-v8a0-IEs OPTIONAL
1> }
1> RRCConnectionReject-v8a0-IEs ::= SEQUENCE {
2> lateNonCriticalExtension OCTET STRING OPTIONAL, --
1> Need OP
2> nonCriticalExtension RRCConnectionReject-v10x0-IEs OPTIONAL
1> }
1> RRCConnectionReject-v10x0-IEs ::= SEQUENCE {
2> extendedWaitTime-r10 INTEGER (1..1800) OPTIONAL, -- Need ON
2> nonCriticalExtension SEQUENCE { }OPTIONAL -- Need OP
1> }
1> -- ASN1STOP
```

The above example relates to an RRC connection reject message. The following example relates to an RRC connection release message.

```
RRCConnectionRelease message
1> -- ASN1START
1> RRCConnectionRelease ::= SEQUENCE {
2> rrc-TransactionIdentifier RRC-TransactionIdentifier,
2> criticalExtensions CHOICE {
3> c1 CHOICE {
4> rrcConnectionRelease-r8 RRCConnectionRelease-r8-IEs,
4> spare3 NULL, spare2 NULL, spare1 NULL
3> },
3> criticalExtensionsFuture SEQUENCE { }
2> }
1> }
...
1> RRCConnectionRelease-v10x0-IEs ::= SEQUENCE {
2> extendedWaitTime-r10 INTEGER (1..1800) OPTIONAL, -- Need ON
2> nonCriticalExtension SEQUENCE {} OPTIONAL -- Need OP
1> }
1> ReleaseCause ::= ENUMERATED {loadBalancingTAUrequired,
2> other, cs-FallbackHighPriority, spare1}
...
1> -- ASN1STOP
```

Figure 9:
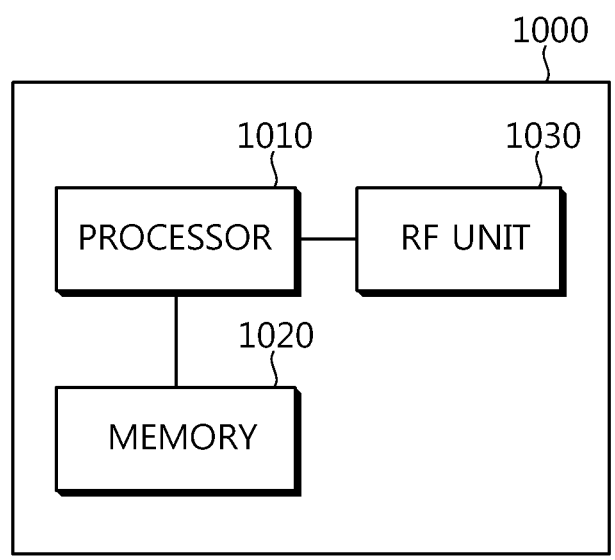
FIG. 9 is a block diagram showing a wireless apparatus to implement technical features of this description.

FIG. 9 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure related above-explained examples.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of performing a radio access procedure in a wireless communication system using a number of orthogonal frequency division multiple (OFDM) symbols, the method performed by a user equipment (UE) and comprising:
   transmitting a radio resource control (RRC) connection request message to a network, wherein an establishment cause of the RRC connection request message is set to be delay tolerant or low priority;
   receiving information associated with a first wait time included in an RRC connection reject message or an RRC connection release message from the network; and
   performing a radio access to the network with a delay which is determined based on a lower bound of the first wait time and a upper bound of the first wait time,
   wherein the lower bound of the first wait time and the upper bound of the first wait time are indicated by the information on the first wait time,
   wherein the information associated with the first wait time includes a first data field and a second data field, and
   wherein the upper bound is indicated by the first data field and the lower bound is determined using a multiplication between a first value indicated by the first data field and a second value indicated by the second data field.

2. The method of claim 1, wherein the delay is determined to be an integer value drawn from a uniform distribution between the lower bound and the upper bound.

3. The method of claim 1, wherein the integer value is transmitted from an RRC of the UE to a non-access stratum (NAS) of the UE to determine a mobility management back-off timer value.

4. The method of claim 1, wherein the step of performing the radio access to the network includes performing an access class (AC) barring procedure to a base station.

5. The method of claim 4, wherein the AC barring procedure is performed after a timer is running, wherein a time value for the timer is a random number drawn from a uniform distribution between the upper bound and the lower bound.

6. The method of claim 1, wherein a second wait time is further included in the RRC connection reject message or the RRC connection release message.

7. The method of claim 6, wherein the first wait time is an extended wait time and the second wait time is a wait time.

8. A method of performing a radio access procedure in a wireless communication system using a number of orthogonal frequency division multiple (OFDM) symbols, the method performed by a user equipment (UE) and comprising:
   transmitting a radio resource control (RRC) connection request message to a network, wherein an establishment cause of the RRC connection request message is set to be delay tolerant or low priority;
   in response to the RRC connection request message, receiving an RRC connection reject message from the network including first information associated with an extended wait time, wherein the first information includes a first portion and a second portion;
   determining a lower bound for the extended wait time and an upper bound for the extended wait time by using the first information associated with the extended wait time;
   drawing a random number from a uniform distribution between the lower bound and the upper bound for the extended wait time;
   starting an extended wait timer according to the drawn number; and
   performing an access class (AC) barring procedure after the extended wait timer is expired,
   wherein the first information associated with the extended wait time consists of most significant bits (MSBs) and least significant bits (LSBs),
   wherein the MSBs consist of consecutive bits representing the upper bound, and the LSBs consist of consecutive bits representing a fraction, and
   wherein the fraction is used to determine the lower bound.

9. The method of claim 8, wherein second information associated with a wait time is further included in the RRC connection reject message.

10. The method of claim 9, further comprising:
    starting a wait timer according to the wait time before starting the extended wait timer.

11. The method of claim 8, wherein the random number is transmitted from an RRC of the UE to a non-access stratum (NAS) of the UE to determine a mobility management back-off timer value.

* * * * *